United States Patent
Vollmerhausen

(10) Patent No.: US 11,120,534 B2
(45) Date of Patent: Sep. 14, 2021

(54) COLOR NIGHT VISION GOGGLE

(71) Applicant: Richard H. Vollmerhausen, Lake Mary, FL (US)

(72) Inventor: Richard H. Vollmerhausen, Lake Mary, FL (US)

(*) Notice: Subject to any disclaimer, the term of this patent is extended or adjusted under 35 U.S.C. 154(b) by 0 days.

(21) Appl. No.: 16/558,419

(22) Filed: Sep. 3, 2019

(65) Prior Publication Data
US 2020/0074603 A1    Mar. 5, 2020

Related U.S. Application Data

(60) Provisional application No. 62/726,453, filed on Sep. 4, 2018.

(51) Int. Cl.
| | |
|---|---|
| *H04N 5/33* | (2006.01) |
| *G06T 5/50* | (2006.01) |
| *G06T 3/40* | (2006.01) |
| *G06T 7/90* | (2017.01) |
| *G06T 5/00* | (2006.01) |
| *G06T 5/20* | (2006.01) |

(Continued)

(52) U.S. Cl.
CPC .......... *G06T 5/50* (2013.01); *G02B 23/12* (2013.01); *G06T 3/4015* (2013.01); *G06T 5/009* (2013.01); *G06T 5/20* (2013.01); *G06T 7/90* (2017.01); *G09G 5/04* (2013.01); *G09G 5/10* (2013.01); *H04N 5/33* (2013.01); *G06T 2207/10024* (2013.01); *G06T 2207/10036* (2013.01); *G06T 2207/10048* (2013.01); *G06T 2207/20221* (2013.01)

(58) Field of Classification Search
CPC .......... G06T 5/50; G06T 7/90; G06T 3/4015; G06T 5/009; G06T 5/20; G06T 2207/10024; G06T 2207/10036; G06T 2207/10048; G06T 2207/20221; H04N 5/33; H04N 5/332; H04N 5/30; G02B 23/12; G02B 30/00
USPC ................. 250/338.1, 208.1; 348/162, 164; 345/213
See application file for complete search history.

(56) References Cited

U.S. PATENT DOCUMENTS

| | | | |
|---|---|---|---|
| 6,570,147 B2* | 5/2003 | Smith | G02B 23/12 250/208.1 |
| 8,212,876 B2* | 7/2012 | Shamir | H04N 5/332 348/162 |

(Continued)

*Primary Examiner* — Trang U Tran
(74) *Attorney, Agent, or Firm* — John L. DeAngelis; Wolter Van Dyke Davis, PLLC

(57) ABSTRACT

A method for generating a color image. The method comprises collecting a color image of a scene, the color image comprising three color slice images, each one comprising color image pixels, and collecting an achromatic image of the scene, the achromatic image comprising achromatic image pixels. The achromatic image having a higher resolution than the color image. The achromatic image is presented on a first screen comprising a white phosphor. The color slice images are processed to reduce noise, to increase a signal-to-noise ratio, to increase contrast, and/or to normalize the pixel intensity values in each color slice. The color image is presented on a semi-transparent screen or display. The semi-transparent screen is situated between an observer and the achromatic image on the first screen. An optical component is used to view an image on the first screen through the semi-transparent second screen.

10 Claims, 2 Drawing Sheets

(51) Int. Cl.
*G09G 5/04* (2006.01)
*G09G 5/10* (2006.01)
*G02B 23/12* (2006.01)

(56) References Cited

U.S. PATENT DOCUMENTS 8,836,793 B1 * 9/2014 Kriesel .................. H04N 5/332
 348/164
8,890,860 B2 * 11/2014 Koyama ................ G02B 30/00
 345/213
9,503,623 B2 * 11/2016 Keesling ................... G06T 5/20

* cited by examiner

COLOR NIGHT VISION GOGGLE

CROSS REFERENCE TO RELATED APPLICATION

The present application claims priority, under 35 U.S.C. 119(e), to the provisional patent application filed on Sep. 4, 2018, assigned application No. 62/726,453, and entitled Resolution Enhancement of Color Images, which is incorporated herein.

FIELD OF THE INVENTION

This disclosure relates to imaging, and more particularly to color vision at night under starlight or other low illumination conditions.

OBJECT OF THE INVENTION

Documentary movie, military, and security applications need color imagery captured at night under low illumination conditions. The invention disclosed herein describes the hardware implementation and image processing algorithms that produce high-quality night vision color imagery.

BACKGROUND DESCRIPTION OF THE PRIOR ART

None of the prior art taken individually or collectively discloses and teaches method for color imaging at night with the color quality provided by the present invention. FIG. 1 illustrates operation of a prior art night vision monocular. The device is monocular because it is viewed with one eye. Binocular devices use two monocular devices of the type illustrated in FIG. 1, one for each eye. The device of FIG. 1 is sometimes referred to as a "third generation" device because it incorporates a cathode material that senses light to 0.9 microns wavelength.

In FIG. 1, a scene 40 is imaged by a lens 41 on a cathode 42 that in turn emits photo electrons (i.e., electrons emitted from an atom by interaction with a photon). The electrons are accelerated toward a micro channel plate (MCP) 43. The MCP defines many small holes that operate as photo-electron multipliers. Electron gain is achieved as the electrons pass through the MCP holes. That is, a voltage is applied across the MCP accelerates the electrons, resulting in electron multiplication as the accelerated electrons hit a wall of the MCP and thereby generate additional electrons. Varying the voltage across the MCP and gating the voltage that accelerates the electrons from the cathode 42 to the MCP 43, controls the numbers of electrons generated within the MCP openings. Here gating refers to turning the voltage on and off quickly, with longer "on" times resulting in more generated electrons.

After the electrons exit the MCP 43, they are accelerated by a high voltage to a phosphor screen 44 where an image 45 of the scene appears. The image 45 on the phosphor screen 44 is bright but achromatic (that is, black and white). A fiber optic twist component 46 erects the image to create a properly oriented image 47. An eyepiece 48 optically presents the image at infinity for viewing by an observer 49.

The device illustrated in FIG. 1 can incorporate different kinds of cathode material 42 in order to respond to different wavelengths of scene light. Additionally, the device may have no MCP 43 or multiple MCPs 43. Also, the phosphor screen 44 can use a green or white phosphor material, but the invention described in this application uses a white phosphor.

The device illustrated in FIG. 1 can be used to generate video of a night scene by incorporating a video camera in the location normally occupied by the eye.

Certain of the characteristics of the goggle described in FIG. 1 are critical to widespread use of the device. One such characteristic is that the phosphor screen provides a high-resolution image, but the goggle consumes little power.

The FIG. 1 device embodies three processes that provide image intensification or gain. First, the image intensifier responds to light that is not visible to the eye; it sees more light than a human sees. This increases the number of photo electrons, and the larger spectral bandwidth therefore generates a brighter image at the phosphor. Second, the number of photo electrons increases by operation of the MCP. Third, the high voltage between the MCP and the phosphor screen accelerates the electrons, causing them to strike the phosphor with sufficient energy to generate a bright image on the screen.

SUMMARY OF THE INVENTION

The invention described in this disclosure incorporates the same image fusion algorithm as described in two commonly-owned and co-pending patent applications filed on even date herewith: (1) entitled Resolution Enhancement of Color Images, assigned application number Ser. No. 16/558,745, and (2) entitled Fusion of Thermal and Reflective Imagery, assigned application number Ser. No. 16/559,622, both of which are incorporated herein in their entirety.

The invention described in this application modifies the prior art device illustrated in FIG. 1 to output a high-resolution color image from a high-resolution achromatic image and a low-resolution color image. Operation of the invention depends on image fusion processes described in the co-pending patent applications referenced herein. The fusion process is also described below and basically involves image multiplication by using a first image as a backlight for illuminating a second image, producing a fused or multiplied image. For example, the co-pending applications describe producing a high-resolution color image by multiplying a high-resolution achromatic image with a spatially registered low-resolution color image.

As is known by those skilled in the art, a color LCD creates an image by controlling the transmission of light originating from behind the LCD (referred to as a backlight) onto the LCD screen.

According to the present invention, the backlight is created by an achromatic image, and a low-resolution color image placed in front of the backlight controls the transmission of light onto the display, effectively multiplying the achromatic backlight image and the low-resolution color image to create a high-resolution color image on the LCD display. In one embodiment, the low-resolution color image controls the transmission of light from a white-phosphor screen that generates an achromatic backlight image, onto the LCD. The high-resolution color image is thereby produced on the LCD.

In one application of the invention, the high-resolution achromatic image is produced in a night vision goggle for viewing by a user. In addition, a color camera is now added, and the color image displayed on a color liquid crystal display (LCD) screen that is situated in front of the phosphor screen (44 in FIG. 1). That is, the LCD screen is disposed in front of the goggle display.

Note that there is very little light in the visible (that is the color) night illumination spectrum. Therefore, the color camera used for night imaging preferably has large pixels to collect the light and therefore generates a low-resolution color image for use by the present invention. Alternatively, the imagery from a high-resolution color camera can be spatially filtered to produce a lower resolution image, but one with a higher signal-to-noise (SNR).

There are two benefits, however, to using a color camera generating large pixels. Large pixels reduce the power required for operating both the camera and the LCD display. Also, the digital processor that interfaces the camera and display consumes less power. As is known, pixel read noise contributes significantly to noise under low illumination conditions. This read noise is reduced in comparison to the signal noise (therefore creating a higher SNR) by using fewer and larger pixels.

Figure 1:
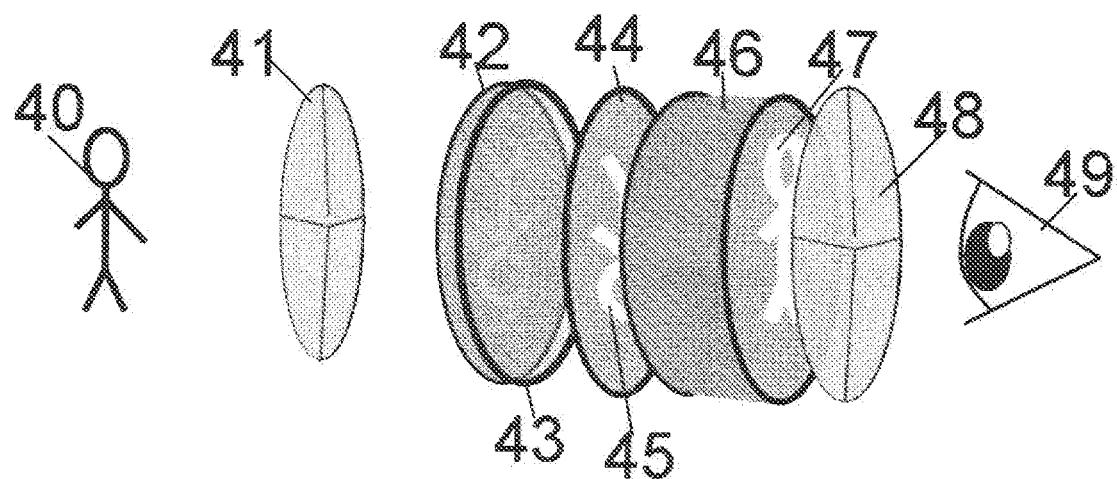
FIG. 1 illustrates the operation of an existing prior art night vision image intensifier device.

The drawings described herein are for illustrative purposes only; the drawings are of selected embodiments, and not all possible apparatus configurations are shown. The drawings are not intended to limit the scope of the present disclosure.

For clarity and in order to emphasize certain features, all of the invention features are not shown in the drawing, and all of the features that might be included in the drawing are not necessary for every specific embodiment of the invention. The invention also encompasses embodiments that combine features illustrated in the drawing; embodiments that omit, modify, or replace some of the features depicted; and embodiments that include features not illustrated in the drawing.

DETAILED DESCRIPTION OF THE PREFERRED EMBODIMENTS

The invention has the potential to be configured in multiple versions so as to generate superior technical performance in any given application. Therefore, it is understood that in some configurations not all elements will always be necessary for the specific embodiment or implementation of the invention. It should also be apparent that there is no restrictive one-to-one correspondence between any given embodiment of the invention and the elements in the drawings.

As used herein, relational terms, such as "first" and "second," "top" and "bottom," and the like, may be used solely to distinguish one entity or element from another entity or element without necessarily requiring or implying any physical or logical relationship or order between such entities or elements.

The present invention includes the conventional elements described in FIG. 1 and adds additional components for use in goggles that provide color night vision in low light condition.

Figure 2:
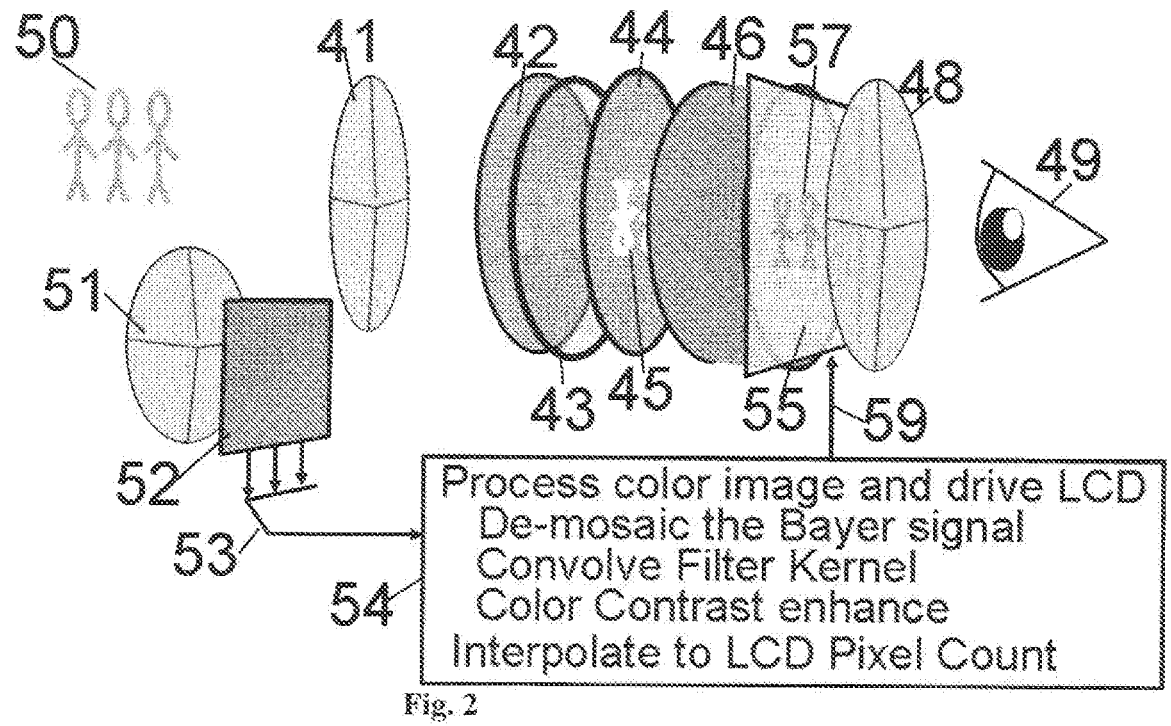
FIG. 2 illustrates augmenting the hardware of FIG. 1 to implement a color night vision goggle according to the present invention.

FIG. 2 illustrates one implementation of a color night vision goggle of the present invention. All of the components 41, 42, 43, 44, 46, and 48 have the same function as in FIG. 1.

A low-resolution LCD 55 is added to an output surface (that is, the viewing surface) of the fiber optic twist component 46. The backlight for the LCD 55 is the achromatic image on the viewing surface of the fiber optic twist component 46.

The scene 50 in FIG. 2 is explicitly colored, although FIG. 2 is a black and white image. A lens 51 images light from the same scene 50 onto a color focal plane array of photo detectors 52. As is known to those skilled in the art, there are many different ways to capture a color image, and the wide variety of color camera designs is well known in the technical community. One common practice uses a single focal plane array of photo detectors with different spectral filters (different colors) over adjacent photo sites. The FIG. 2 configuration uses a Bayer-like spectral filter on the focal plane array. These arrays use "Bayer" or "Bayer like" color filter patterns to capture a colored image using one focal plane. Bayer like camera implementations are common because only one focal plane is needed. The three-color images are demosaiced (separated) by a digital processor that is usually part of the camera "core" or support electronics.

Figure 3:
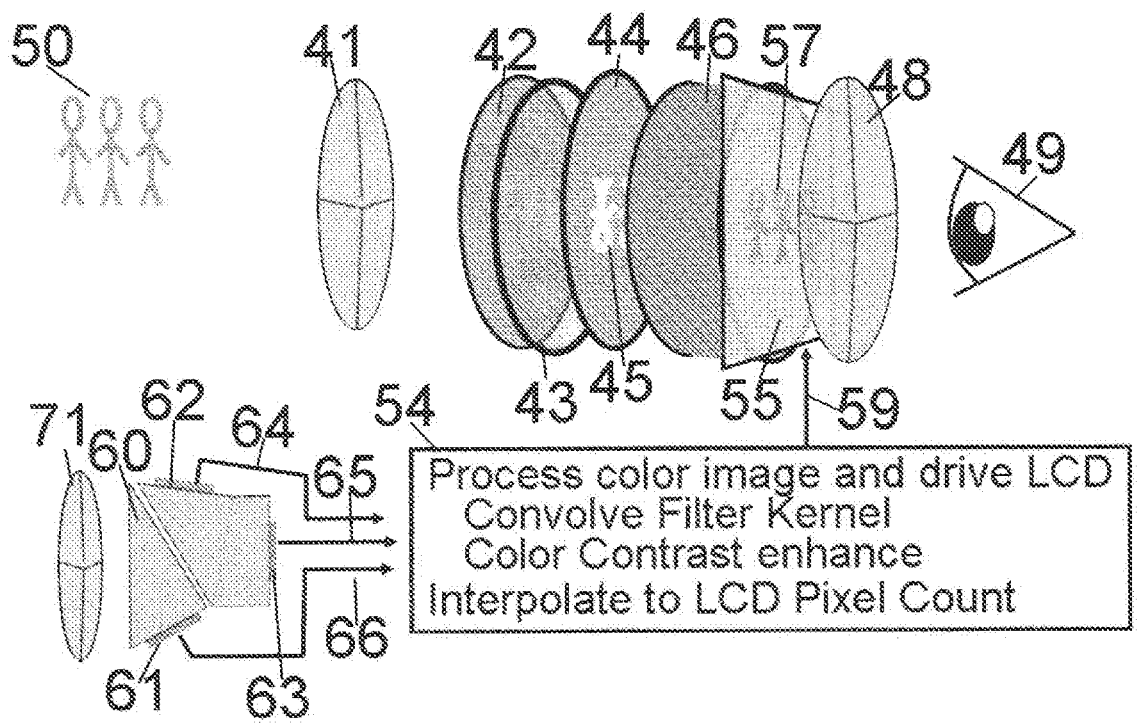
FIG. 3 includes multiple photo arrays to produce a superior color picture.

However, the scene can also be optically split into three color images, red, green, and blue. For example, as illustrated in FIG. 3 and described further below, a Phillips prism optically splits the image of the scene. Then three focal planes are positioned relative to the prism to capture each color image. Although more complicated in the sense that three focal planes plus a prism (or beam splitters) are needed, the multiple focal plane solution provides better scene sampling and a better signal-to-noise ratio because all of the photo detectors in each array are devoted to a single color.

The present invention uses any of the available techniques to capture a color image. However, given the low signal available under starlight illumination, the three-array solution (that is, the approach illustrated in FIG. 3) is preferred. Also, since only low-resolution color images are required according to the present invention, each focal plane uses large pixels and is easily driven electronically at low clock rates. Generally, large pixels refer to a low pixel count array to cover a field of view. While modern cameras use at least hundreds and more likely 1,000 by 1,000 pixels in an image, the color camera employed in the present invention may comprise 10 by 10 pixels or 100 by 100 pixels. This low pixel count makes it possible to use a large pixel pitch and collect more light per pixel.

Returning to FIG. 2, an output signal 53 from the photo detectors 52 represents the scene 50 with three color images (red, green, and blue), also called color slices.

If the color capture process uses a Bayer-like approach, then it is likely that each color slice will require additional spatial filtering by convolving each color slice with a spatial kernel to improve the signal-to-noise ratio. Regardless of color capture approach, each color slice is contrast enhanced.

If the pixel count in the output signal 53 differs from the pixel count required for the LCD 55, each color slice is interpolated to generate the required number of inputs (pixels) to the LCD 55.

Finally, the digital processor 54 drives the LCD 55 via an electrical interface signal 59.

The digital processor 54 also controls gain and level, focal plane array exposure times, and other functions needed to operate and display a color picture on the LCD 55. The functions needed to operate a color imager are well known to the industry and are not detailed here.

In one embodiment the achromatic image comprises a near infrared (NIR) achromatic image (processed through the components 41, 42, 43, 44, 46, and 48) generates an appropriate image for display. Likewise, the digital processor 54 maintains the color image, albeit low resolution, with acceptable contrast. The eye 49 views the high resolution NIR image through the low-resolution color LCD 55. Viewing the achromatic image through the color display effectively multiplies the two, implementing image color fusion, and the observer or video camera perceives a high-resolution color scene 57 (see FIG. 2). In another embodiment an SWIR (shortwave infrared region) image is generated in lieu of the NIR image. The NIR and SWIR spectral bands are generally considered to range from about 0.65 to 1.0 microns and 1.0 to 2.0 microns, respectively, although the specific limits of these spectral bands have not been standardized.

Better performing color night vision goggles can be implemented according to the FIG. 3 embodiment by using three arrays to collect the color image. However, the use of three arrays and the prism or beam splitter increases system weight and power consumption when compared to the FIG. 2 implementation.

In the embodiment of FIG. 3, a lens 71 focuses light from the scene 50 to a Phillips prism 60 that splits the light into three color bands (blue, green, and red) and focuses the light onto three monochrome photo detector arrays 61 (blue), 62 (red) and 63 (green). The resulting three color slices 64, 65, and 66 are output to the digital processor 54.

Except for the omission of the process of de-mosaicing the Bayer single image, the three-photo detector array implementation of FIG. 3 uses the same signal processing as the single photo detector array implementation in FIG. 2. Implementation of the LCD display 55 with the fiber optic twist 46 is the same as in FIG. 2.

Figure 4:
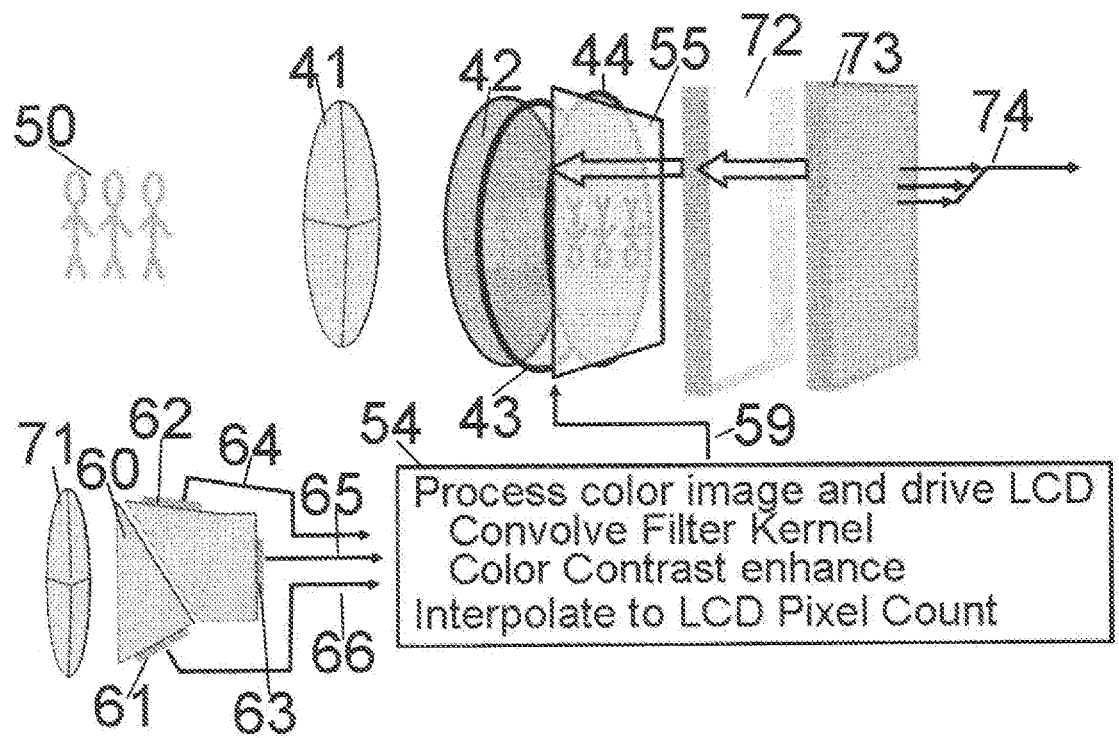
FIG. 4 illustrates how the direct view goggle in FIG. 3 can be converted to a camera to output an electrical signal for remote viewing of the color images of the scene.

FIG. 4 illustrates an embodiment that converts the visual direct view color output using the eyepiece 48 in FIGS. 2 and 3 to an electronic video output. The scene 50 and components 41, 42, 43, 44, 54, 55, 59, 60, 61, 62, 63, 64, 65, and 66, remain the same as in FIG. 2 or 3. The fiber optics twist component 46 and the eyepiece 48 in FIGS. 1, 2, and 3 are not needed in the FIG. 4 embodiment but can be included if convenient. The image intensifier phosphor 44, the LCD 55, a fiber optics plate or reducer 72, and a high-resolution color focal plane array 73 are sandwiched together as indicated by the arrows in FIG. 4. The color slice outputs 74 in a Bayer or Bayer-like format are encoded in one output image 74.

The FIG. 4 implementation allows the scene image to be output to video monitors. The fiber optics twist component 46 is not shown in FIG. 4 but can be used if convenient. The LCD 55, the fiber optic plate or reducer 72, and the high-resolution color focal plane array 73 can all be layered on the output face of the fiber optic twist component 46.

It should be understood, of course, that the foregoing description relates to exemplary embodiments of the invention and that modification may be made without departing from the spirit and the scope of the invention, as set forth in the following claims.

What is claimed is:

1. A color night vision imager, comprising:
    an electron emitting component for emitting electrons responsive to light from a scene striking the electron emitting component;
    an image-generating surface responsive to the electrons to create an achromatic image thereon, wherein the achromatic image comprises a near-infrared image or a shortwave infrared image;
    a spectral filter for filtering color light from the scene into a plurality of frequency bands thereby producing a low-resolution filtered image, wherein the filtered image has a first resolution and the achromatic image has a second resolution, the second resolution greater than the first resolution;
    a color focal plane array of photo detectors responsive to the low-resolution filtered image;
    a color liquid crystal display; and
    a digital processor for generating signals to drive the liquid crystal display responsive to the photo detectors, the image-generating surface positioned to operate as a backlight for the liquid crystal display, so that the achromatic image is viewed through the liquid crystal display, effectively resulting in a fusion of the achromatic image and the low-resolution filtered image to create a color display image on the liquid crystal display.

2. The color night vision imager of claim 1 further comprising a lens for focusing the scene light onto the electron emitting component.

3. The color night vision imager of claim 1 further comprising an image intensifier disposed between the electron emitting component and the image-generating surface.

4. The color night vision imager of claim 1 wherein the image-generating surface comprises a white phosphor screen.

5. The color night vision imager of claim 1 wherein the achromatic image is inverted, the color night vision imager further comprising a component to present the achromatic image in a correct orientation.

6. The color night vision imager of claim 1 wherein the spectral filter comprises a Bayer color filter or a Phillips prism.

7. The color night vision imager of claim 1 wherein the plurality of frequency bands comprises three frequency bands, further comprising a red frequency band, a green frequency band, and a blue frequency band.

8. The color night vision imager of claim 1 wherein the processor further processes each one of the plurality of frequency bands to reduce noise therein.

9. The color night vision imager of claim 1 wherein the processor further processes each one of the plurality of frequency bands to increase contrast therein.

10. A night vision goggle comprising the color night vision imager of claim 1.

* * * * *